United States Patent [19]

Deacon

[11] 4,087,155

[45] May 2, 1978

[54] SINGLE OPTICAL FIBER CONNECTOR UTILIZING SPHERICAL ALIGNMENT ELEMENTS

[75] Inventor: George Ronald Deacon, Corona Del Mar, Calif.

[73] Assignee: International Telephone & Telegraph Corporation, New York, N.Y.

[21] Appl. No.: 780,259

[22] Filed: Mar. 23, 1977

[51] Int. Cl.² .......................... G02B 5/14; B23Q 3/00
[52] U.S. Cl. ................... 350/96.21; 29/464; 403/13; 403/14
[58] Field of Search ............... 350/96 C, 96 R, 96 B; 403/13, 14; 29/464, 466, 468, 592

[56] References Cited

U.S. PATENT DOCUMENTS

| | | | |
|---|---|---|---|
| 3,989,567 | 11/1976 | Tardy | 350/96 C |
| 4,047,796 | 9/1977 | Kao et al. | 350/96 C |
| 4,050,781 | 9/1977 | Beauhaire | 350/96 C |
| 4,050,783 | 9/1977 | Tardy | 350/96 C |
| 4,056,305 | 11/1977 | McCartney | 350/96 C |

Primary Examiner—John K. Corbin
Assistant Examiner—Stewart Levy
Attorney, Agent, or Firm—Thomas L. Peterson

[57] ABSTRACT

A connector for coupling a pair of single optical fibers is disclosed. Each contact of the connector utilizes three spheres of equal diameter defining a tricuspid interstitial space therebetween into which the end of a fiber is mounted. The spheres are embraced by a circular race. In the preferred embodiment, the spheres engage each other and the race. When a pair of contacts are mated in axial abutting relationship, the spheres in the mating contacts nest with respect to each other, thereby precisely laterally aligning the optical fibers which are mounted in the interstitial spaces of the sets of spheres in the two contacts. In another embodiment, the spheres are dimensioned so they do not engage each other, but engage the optical fiber at three points. Also, more than three spheres may be mounted in a contact for positioning a fiber therein.

35 Claims, 10 Drawing Figures

SINGLE OPTICAL FIBER CONNECTOR UTILIZING SPHERICAL ALIGNMENT ELEMENTS

The Government has rights in this invention pursuant to Contract No. DAAB07-76-C-1357 awarded by the Department of the Army.

BACKGROUND OF THE INVENTION

The present invention relates generally to a connector and, more specifically, to an optical coupler for single optical fibers.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer claddings or jackets. The jackets make them resemble ordinary metallic-core electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics," by Narinder S. Kapany, published in *Scientific American*, Vol. 203, pgs. 72-81, November 1960, provides a useful background in respect to some theoretical and practical aspects of fiber optic transmission.

Of considerable relevance to the problem of developing practical fiber optic connectors is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal*, Vol. 50, No. 10, December 1971, specifically to an article by D. L. Bisbee, entitled, "Measurement of Loss Due to Offset, and End Separations of Optical Fibers." Another *Bell System Technical Journal* article of interest appeared in Vol. 52, No. 8, October 1973, and was entitled, "Effect of Misalignments on Coupling Efficiency on Single-Mode Optical Fiber But Joints," by J. S. Cook, W. L. Mammel, and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy, and higher signal-to-noise ratio. The difficulty in achieving connections between single fibers which are insensitive to axial misalignment problems has created an obstacle to the use of long run single data transmission systems.

Therefore, a connector or coupler is required to eliminate lateral tolerances if low-loss connections are to be obtained in the use of single fiber optical transmission arrangements, "V" groove and metal sleeve arrangements have been used to interconnect single fibers. Reference is made to U.S. Pat. No. 3,768,146 which discloses a metal sleeve interconnection for single fibers.

Another known device, as shown in U.S. Pat. No. 3,734,594, utilizes a deformable annular core having pressure plates at the ends. The fiber ends are inserted into the core and an axial force is applied to the plates to deform the core radially, thereby aligning and securing the fibers.

These prior devices, however, do not readily provide sufficient accuracy for joining and aligning small diameter cores of optical fibers.

Copending application of Charles K. Kao entitled, "Precision Optical Fiber Connector," Ser. No. 613,390, filed Sept. 15, 1975 now U.S. Pat. No. 4,047,796, assigned to the assignee of the present application, discloses a single optical fiber connector in which the ends of mating fibers are precisely aligned and coupled together in the interstice between three like contacting cylindrical rods. The rods are mounted along and around the fibers within an adjustable connector assembly. Means is provided for expanding the interstice to insert the fiber ends and for clamping the rods in position around the fibers. Copending application of Charles K. Kao entitled, "Precision Surface Optical Fiber," Ser. No. 629,210 filed Nov. 5, 1975 now U.S. Pat. No. 4,057,322, assigned to the assignee of the present application, discloses an optical fiber in which the plastic cladding thereof is formed with three rounded indentations along its surface and a thin metal ferrule is formed around the cladding at the mating end of the fiber. A pair of such fibers may be aligned in a three rod arrangement of the type mentioned above.

A hermaphroditic connector for coupling a pair of single optical fibers is disclosed in copending application of Ronald L. McCartney entitled, "Single Optical Fiber Connector," Ser. No. 629,004, filed Nov. 5, 1975 now abandoned, also assigned to the assignee of the present application. The connector comprises a pair of connector members each containing at least one single optical fiber terminated by a termination pin. The pin includes a metal eyelet crimped about the optical fiber in three places providing three, spaced, curved indentations which centrally position the fiber in the pin. When the connector members are mated, the mating termination pins are positioned so that the indentations therein are generally aligned. Three arcuate cam or spring members are forced into the indentations in the mating termination pins to accurately laterally align the pins and, hence, the optical fibers therein.

In copending application of Ronald L. McCartney entitled, "Single Optical Fiber Connector," Ser. No. 680,171, filed Apr. 26, 1976, there is disclosed a single optical fiber connector comprising a base plate having a V-groove in its upper surface having a transverse cross section of an equilateral triangle. Two sets of three equal diameter cylindrical rods lie in the groove, each defining an interstitial space therebetween which receives an optical fiber. The sets of rods have mating end faces which abut each other in the groove. A compression plate is mounted over the base plate to arrange the rods in the V-groove so that the centers of the rods are disposed at the vertices of the same equilateral triangle whereby the fibers in the interstitial spaces between the rods become precisely laterally aligned. Such connector arrangement is particularly suited for a flat cable having single optical fibers.

In copending application of R. L. McCartney et al, entitled, "Single Optical Fiber Connector Utilizing Elastomeric Alignment Device," Ser. No. 680,170, filed Apr. 26, 1976 now U.S. Pat. No. 4,056,305, there is disclosed a single optical fiber connector which incorporates a deformable elastomeric alignment element having a bore therethrough. A pair of contacts are mounted lengthwise in the bore. The contacts embody like sets of three equal diameter cylindrical rods. Preferably, the rods are formed of plastic and are integral with a plastic body of the contact. The adjacent cylindrical surfaces of the rods of each contact provide a tricuspid interstitial space for receiving an optical fiber. The sets of rods of the contacts have mating end faces which abut each other when the contacts are pushed into the opposite ends of the bore in the alignment element. The relative dimensions of the two sets of rods and the bore in the elastomeric alignment element are selected so that the region of the element surrounding the mating end faces of the rods is strained to exert a radially inwardly directed compressive force urging the rods of each set inwardly. Such inward compression of the rods causes the adjacent cylindrical surfaces thereof to engage each other and the fiber disposed therebetween so that the centers of the three rods of each contact are disposed at the vertices of an equilateral triangle, whereby the fibers in the contacts become precisely laterally aligned. Such coupling arrangement is suited for axially mated connectors.

The three-rod contact alignment approach discussed hereinabove has been found to suffer some problems. Normally, the optical fiber mounted in the interstitial space defined by the three rods of the contact is recessed slightly behind the mating end faces of the rods so that when two mating contacts are abutted under axial compression force, the fibers therein will not engage each other but will be slightly spaced apart. Since the alignment rods are formed of plastic, the rods experience axial creepage due to the axial compression force applied to the contacts to maintain them in mating engagement. The creepage of the rods causes the fibers mounted therebetween to be exposed at their ends with the result that the fibers in the mating contacts eventually touch each other. The engagement of the fibers causes the fibers to chip at their end faces, resulting in light transmission losses. Also, frequently the fibers will buckle and crack under the axial compressive loads. The foregoing problem of axial creepage of plastic rods may be overcome by the use of hard metal rods on the contact, but this requires additional parts and, therefore, increases manufacturing costs.

It is therefore, the object of the present invention to overcome the aforementioned disadvantages of the three-rod alignment approach but still provide a controlled, accurate alignment of mating single optical fibers in a manner which will minimize light transmission losses, which is easily manufactured and assembled, relatively inexpensive, and practical for commercial field use.

SUMMARY OF THE INVENTION

According to the principal aspect of the present invention, there is provided a fiber optic connector for releasably coupling a pair of single optical fibers. The connector employs at least one pair of mating contacts. Each contact contains a set of equal diameter spheres arranged in closely adjacent, but not necessarily engaging, relationship defining an interstitial space therebetween. The centers of the spheres lie in a common plane. The contact body supports a single optical fiber so that the end portion thereof lies in the interstitial space defined between the spheres. The spheres are dimensioned to closely confine the fiber in the space. In the preferred embodiment, the mating contacts are abutted under an axial compression force which causes the spheres in one contact to nest with respect to the spheres in the other contact so that the spheres in the respective contacts cooperate with each other to cause the optical fibers mounted therein to become precisely laterally aligned. The spheres may be metal ball bearings which may be manufactured to extremely precise diameters, thereby assuring that the interstitial space defined between the spheres of a set will be precisely dimensioned so that a fiber of a suitable cross section will not be damaged by the spheres. Further, because the spheres may be formed of metal, they will not be subject to creepage as are the plastic alignment rods in the aforementioned prior art connector. Therefore, the connector of the present invention allows precise alignment of single optical fibers by the use of components which are readily available, inexpensive, and may be assembled at relatively low cost. The invention also provides a connector which may be readily terminated to fiber optic cables in the field by relatively unskilled personnel.

DESCRIPTION OF THE PREFERRED EMBODIMENTS

Figure 1:
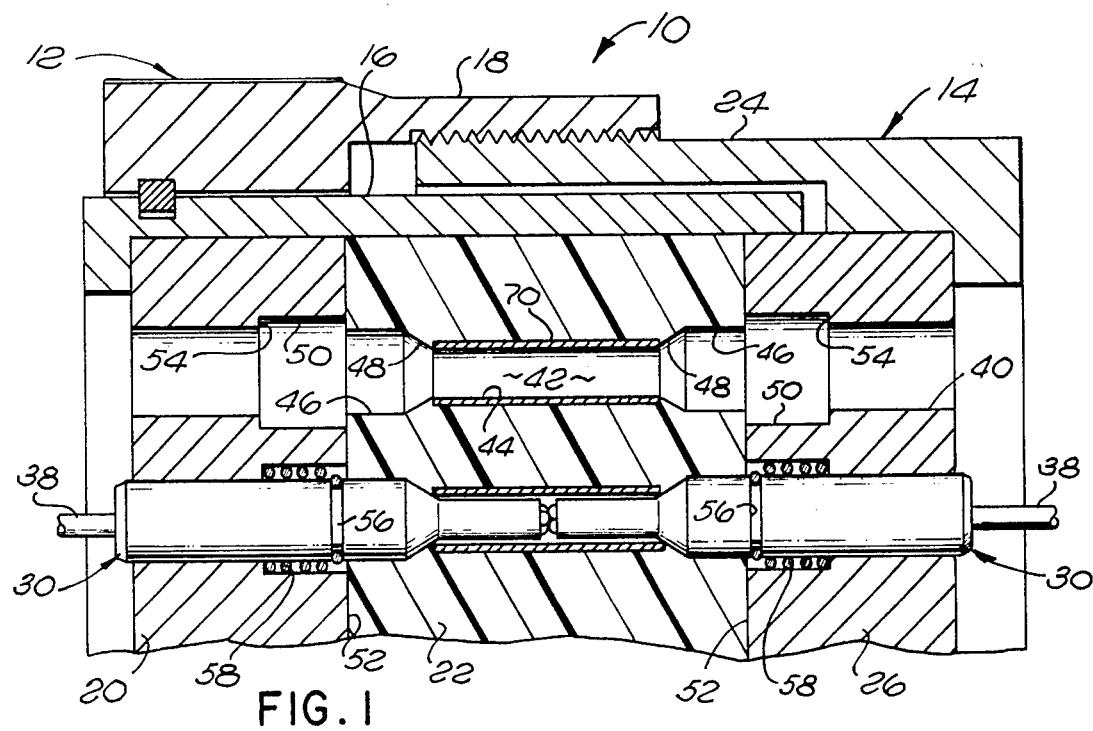
FIG. 1 is a partial longitudinal sectional view through one embodiment of the connector of the present invention showing two pairs of contact cavities with one pair of fiber optic contacts mounted in one cavity in axial abutting relationship.
Figure 2:
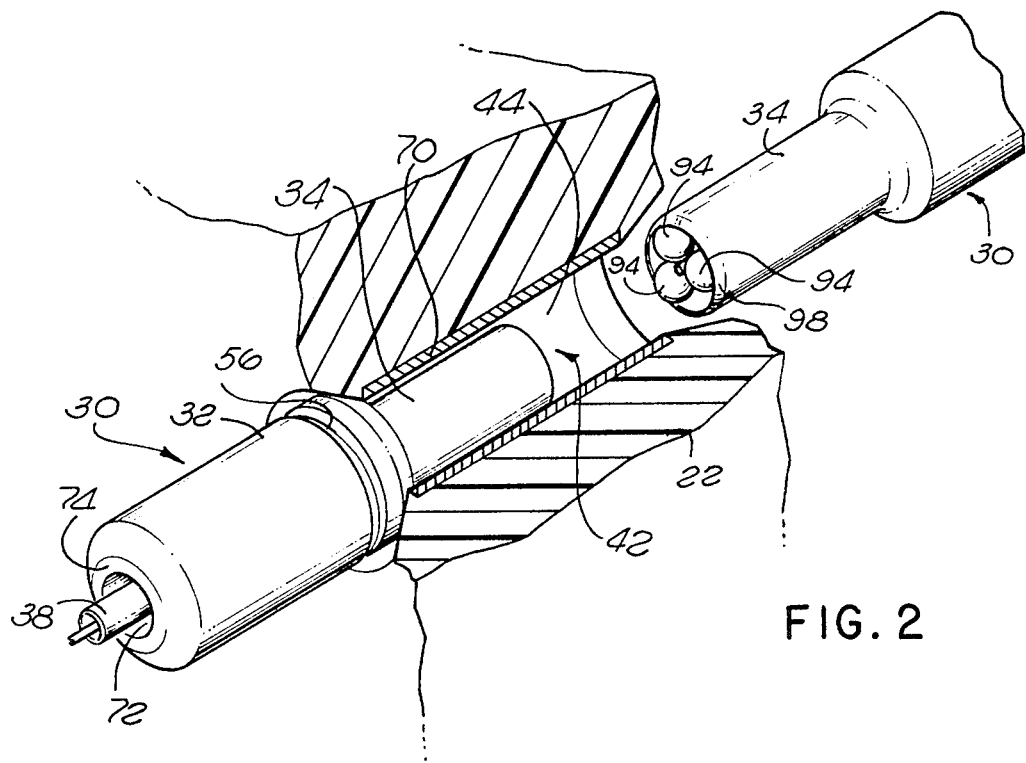
FIG. 2 is a perspective, fragmentary illustration of the internal portion of the connector of FIG. 1 showing one fiber optic contact, containing three spheres, mounted in a guide sleeve in an elastomeric sealing plate in the connector and the mating contact outside of the sleeve positioned to be inserted therein.

Referring now to FIG. 1 of the drawings in detail, there is illustrated the connector of the present invention, generally designated 10, which comprises a plug connector member 12 and mating receptacle member 14. The plug connector member 12 comprises a shell 16 having a coupling nut 18 rotatably mounted thereon. A contact mounting member 20 is mounted in the shell 16. An elastomeric sealing plate 22 is mounted in the shell in front of the member 20. The receptacle connector member 14 comprises a shell 24 having a contact mounting member 26 mounted therein. The shell 24 is dimensioned so that the shell 16 of the plug connector member is slidably insertable therein. The coupling nut 18 is threadedly engaged with the shell 24 so that, by rotating the coupling nut, the plug and receptacle connector members may be drawn together into mating relationship.

The contacts of the present invention, generally designated 30, are mounted in aligned passages in the mating plug and receptacle members. Each contact comprises an elongated cylindrical body 32 having a reduced diameter forward portion 34 and an enlarged rear portion 35. The forward portion 34 contains the alignment elements for the single optical fiber 36 of an optical fiber cable 38. The alignment elements will be described later herein.

The mounting members 20 and 26 in the plug and receptacle connector members, respectively, have bores 40 therein aligned with bore 42 extending through the sealing plate 22. While two sets of said bores 40, 42 are shown in FIG. 1 for receiving two pairs of mating contacts 30, obviously, additional bores may be provided for a greater number of light transmitting channels in the connector.

Each bore 42 in the sealing plate 22 has a central uniform diameter section 44 which receives the forward portions 34 of the contacts 30. Counterbores 46 are formed in the opposite end faces of the sealing plate 22 coaxial with the central section 44 of each bore 42. Tapered transitional regions 48 join the counterbores 46 to the central sections 44 of the bores 42. The diameter of each counterbore 46 is slightly greater than the diameter of the rear portion 35 of each contact so as to slidably receive the body of the contact.

A counterbore 50 is formed in the flat face 52 of each member 20 and 26, defining between it and the bore 40 an annular forwardly facing shoulder 54. An annular groove 56 is formed in the rear portion of each contact 30. The shoulders 54 in the members 20 and 26 and the grooves 56 in the contacts are so located that when a pair of contacts are fully mounted in mating relationship in a bore 42 in the sealing plate 22, the grooves 56 will be located in front of the shoulder 54 but just behind the faces 52 of members 20 and 26, respectively. Springs 58 are positioned in the counterbores 50 surrounding the contacts. The rear convolution of each spring engages the shoulder 54 while the front convolution is reduced in diameter and is seated in the contact groove 56.

When the coupling nut 18 is threaded onto the shell 24 of the receptacle connector member 14, the members 20 and 26 will move axially toward each other causing the mating end faces of the contacts to engage in the central region of the bore 42 and compressing the elastomeric sealing plate 22 and the spring 58. Axial compression of the sealing plate causes the walls of the counterbores 46 to deform radially inwardly and contract around the bodies 32 of the contacts to provide a seal therebetween which will prevent the intrusion of dust or other contaminants into the central region of the bore 42 where they may interfere with the optical coupling made between the contacts in the bore. Also, contraction of the bore wall around the contacts dampens vibration of the contacts during use of the connector. Compression of the springs assures that the mating end faces of the contacts will be engaged with an axial compression force. Thus, the contacts will be assured of being retained in their abutting relationship. The spring arrangement also provides relief in manufacturing tolerances of the contact mounting members and the contacts.

A metal cylindrical guide sleeve 70 is mounted in the central section 44 of each bore 42. The guide sleeve has an inner diameter slightly greater than the diameter of the cylindrical forward portion 34 of each contact so that the contacts are loosely fitted into the sleeve. As will become more apparent from the following description, the guide sleeve does not function to produce precise axial alignment between the optical fibers in the mating contacts 30. In fact, it is important that the sleeve not control the alignment of the contact bodies.

Figure 3:
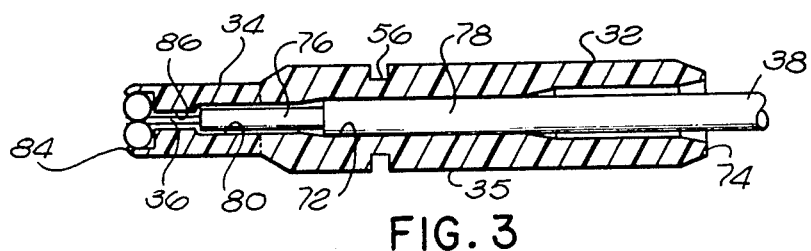
FIG. 3 is a longitudinal sectional view of one of the contacts illustrated in FIGS. 1 and 2 showing the contact terminated to a fiber optic cable.

Referring again to FIG. 3, the contact body 32 may be made of plastic or metal. The body has a bore 72 therein coaxial with the axis of the body and opening at the rear end 74 thereof. The bore is dimensioned to slidably receive the optical fiber cable 38. The optical fiber 36 of the cable has an inner jacket 76 and an outer jacket 78. The forward portion of the outer jacket is removed from the cable to expose the inner jacket 76, and the forward section of the inner jacket is removed to expose the optical fiber 36. The bore 72 in the contact body has a reduced diameter forward section 80 which receives the inner jacket 76.

Figure 5:
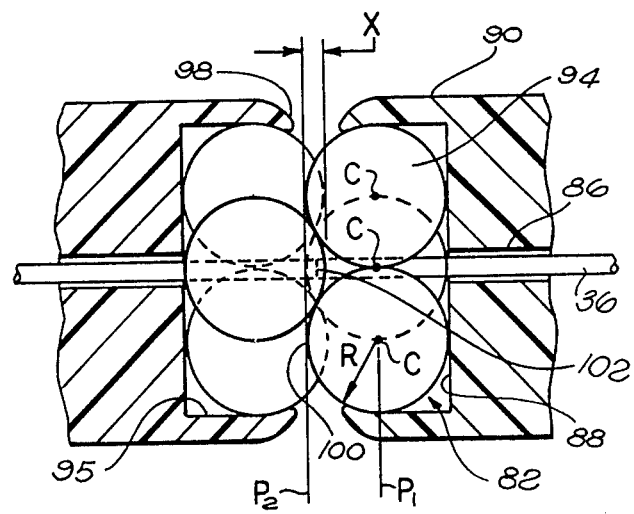
FIG. 5 is an enlarged, partial longitudinal section of the forward ends of the mating contacts illustrated in FIG. 1.

As best seen in FIG. 5, a cylindrical recess 82 is formed in the front end 84 of the contact body coaxial with the axis of the bores 72 and 80. A small diameter bore 86 leads from the bore 80 to the bottom 88 of the recess. The bore 86 is coaxial with the center axis of the cylindrical recess and is dimensioned to loosely receive the optical fiber 36 therein. The cylindrical recess 82 provides a circular ring 90 which extends forwardly from the body 32 of the contact.

Figure 4:
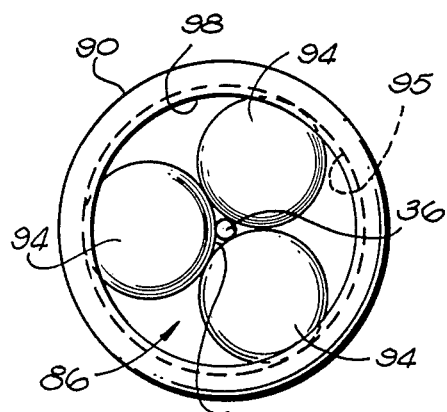
FIG. 4 is an enlarged front end view of the contact illustrated in FIG. 3 showing the three spheres of the contact engaging each other.

The fiber alignment elements of the present invention comprise a plurality of equal diameter spheres 94 mounted in the recess 82. It is preferred that there be three of such spheres in the recess, although a greater number of spheres may be utilized as will be explained later herein in reference to the embodiment illustrated in FIG. 10. Preferably the spheres are dimensioned so that they engage the cylindrical wall 95 of the recess 82. Such wall forms a circular race which embraces the spheres and allows the spheres to rotate in a circular path in the recess. Also, the spheres are dimensioned so that they will engage each other, as seen in FIG. 4. Further, the spheres are capable of rotating about their center axes. The spheres are preferably steel ball bearings which may be manufactured to precise dimensions, thereby permitting the foregoing contact engagement between the spheres and the circular race 95 of the recess to be achieved at relatively low cost. As well known in the art, ball bearings may be manufactured to dimensions varying only about 5–50 millionths of an inch.

As seen in FIG. 4, the adjacent circular surfaces of the spheres 94 define a tricuspid interstitial space 96 therebetween. Preferably, the spheres are dimensioned so that the optical fiber 36 is not engaged thereby, but is slightly loose in the space 96. In this fashion, no forces are applied laterally against the fiber which may cause it to fracture.

In order to retain the spheres 94 in the recess 82, the forward end of the circular ring portion 90 of the contact is spin-formed to provide a forward inwardly extending annular lip 98.

As stated previously herein, by the use of the connector arrangement illustrated in FIG. 1, the mating contacts 30 in the connector are caused to engage under axial compression force. Further, the forward end portions of the contacts are slightly loose in the metal guide sleeve 70 so they are capable of minor lateral movement. When the sets of spheres in the forward ends of the contacts are engaged under an axial compression force, the spheres will nest with respect to each other as illustrated in FIG. 5. Such nesting will occur even though the spheres may not be properly oriented for nesting when the contacts are initially inserted into the guide sleeve. The axial compression force between the sets of spheres, together with the fact that the spheres are rotatable about their own centers and are rotatable within the circular races 95 defined by the recesses 82, cause the spheres to become self-nested. As a consequence, the optical fibers 36 mounted in the interstitial spaces 96 defined by the spheres in the contacts will become precisely laterally aligned. Thus, in accordance with the invention, two sets of spheres cooperate with each other to produce alignment of the fibers. There is no reliance whatsoever upon the outer surfaces of the contact bodies to achieve alignment between the optical fibers mounted therein, which is normally the case in prior art single fiber connectors.

It is noted that the centers C of the spheres 94 in each contact lie on a common plane P1 (see FIG. 5) which is transverse to the center axis of a cylindrical recess 82. The forwardmost surfaces 100 of the spheres lie in a second common plane P2 which is parallel to the plane P1.

Since the two sets of spheres 94 in the mating contacts nest with respect to each other, it will be appreciated that the forward end of the retention lip 98 of each contact must be positioned behind the plane P2 a sufficient distance so as not to interfere with the nesting of the spheres. This requires that the lip be positioned behind the plane P2 a minimum distance X as indicated in FIG. 5. X is equal to 0.367R, where R is the radius of the spheres.

Also, because the two sets of spheres nest with respect to each other when the contacts are mated in the embodiment illustrated in FIGS. 1 to 5, the end face 102 of each optical fiber must be positioned behind its respective plane P2 a sufficient distance so that the fibers to be mated will not abut or will just barely touch so that scratching or chipping of the fiber faces is avoided.

Figure 6:
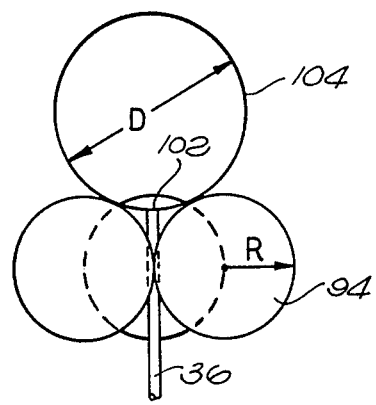
FIG. 6 shows how a spherical tool is utilized to appropriately position an optical fiber in the interstitial space defined by the three spheres of the contact.

In order to properly position a fiber 36 in its respective set of spheres 94, a large diameter spherical tool 104 may be utilized, as illustrated in FIG. 6. The spherical tool 104 has a diameter D equal to at least 2.72R, where R is the radius of one of the spheres 94. By positioning the tool 104 centrally in the front cavity defined by the three spheres 94, the fiber 36 may be positioned properly with accuracy by inserting it into the interstitial space between the spheres 94 until it abuts the tool 104. By using such a tool having a diameter D equal to 2.72R, the end face 102 of the fiber will be positioned so that when a pair of mating contacts are abutted with their spheres in nesting relationship, the fiber end faces will lie in a common plane. By way of example only, if the radius R of each sphere 94 is 0.03125 inch and the diameter D of the tool 104 is 0.085 inch, the end faces of the fibers will just touch in a common plane. If D is equal to 3R, the end faces of the fibers will be slightly spaced apart, but not so far as to cause significant light transmission losses.

Figure 7:
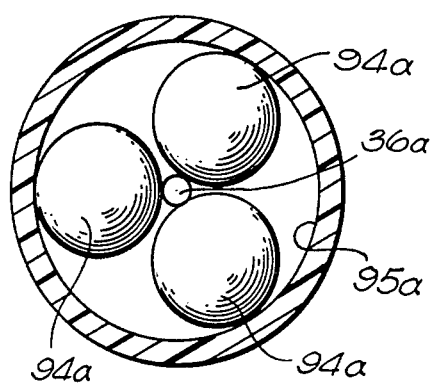
FIG. 7 is a transverse sectional view taken through an alternative form of the contact of the present invention wherein the spheres do not contact each other.

Whereas in the embodiment illustrated in FIGS. 1 to 5, the optical fiber 36 is positioned in an interstitial space defined by three engaging spheres, the spheres need not contact each other in order to center the fiber. As seen in FIG. 7, the spheres 94a and the circular race 95a are dimensioned so that the spheres in the contact do not contact each other but do contact the optical fiber 36a at three points. Even though the spheres do not contact each other and are spaced apart from each other different distances, the spheres cooperate with the circular race 95a to center the fiber 36a. When a pair of contacts as illustrated in FIG. 7 are mated, the spheres in the two contacts will nest with respect to each other, bringing the optical fibers therein into precise lateral alignment.

Figure 8:
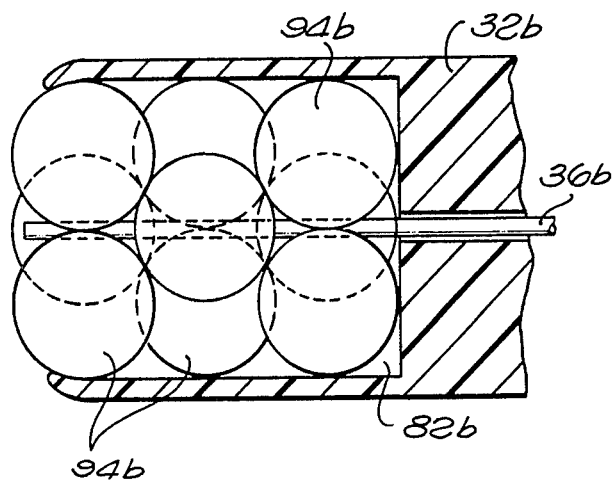
FIG. 8 is an enlarged, partial longitudinal sectional view of the forward end of another form of the contact of the present invention utilizing three sets of spheres.

In the embodiment illustrated in FIG. 8, three sets of spheres 94b are mounted in a recess 82b of the contact body 32b. The centers of the spheres of each set define planes which are parallel and spaced from each other. As seen in FIG. 8, the spheres in the three sets are arranged to nest with respect to each other. The contact illustrated in FIG. 8 functions in the same manner as the contact illustrated in FIGS. 1 to 5. However, the spherical alignment mechanism for the optical fiber 36b is longer.

Since the spheres in the mating contacts in the embodiments of the invention illustrated in FIGS. 1 to 5, 7, and 8, nest with each other, it is not necessary that the contacts be keyed into alignment in the connector body. To the contrary, the contacts not only may be mounted loosely in the guide sleeve 70 for slight lateral adjustment, they may be free to rotate slightly about their longitudinal axis to facilitate nesting of the spheres at the mating ends of the contacts.

Figure 9:
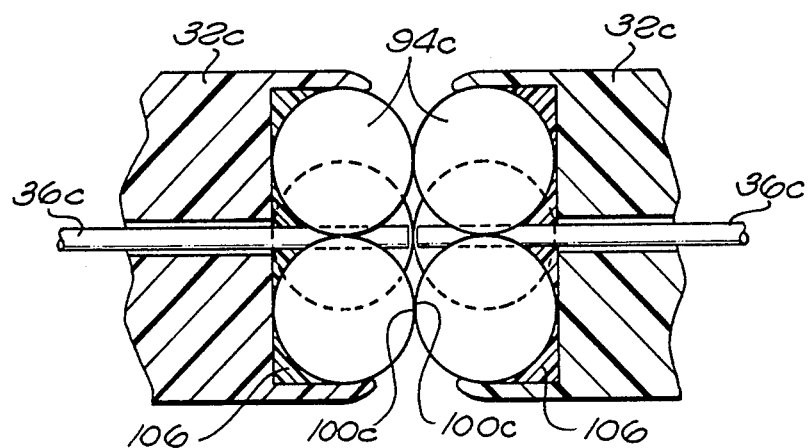
FIG. 9 is an enlarged partial longitudinal sectional view through the end portions of a pair of mating contacts in accordance with an alternative embodiment of the invention.

In the embodiment illustrated in FIG. 9, the spheres 94c in the respective contact bodies 32c are potted into place by a suitable epoxy 106 after the fibers 36c are mounted in the interstitial spaces between the sets of spheres so as to make the spheres immovable. The contact bodies 32c are provided with means for keying the contacts in the connector body, not shown, which causes the spheres in the two contacts to abut at their forwardmost surfaces 100c as seen in FIG. 9 in order to achieve alignment between the fibers 36c. Thus, in this embodiment the nesting of the two sets of spheres in the contacts is not utilized to achieve alignment between the optical fibers. As a consequence, unlike the first three embodiments of the invention illustrated in FIGS. 1 to 5, 7 and 8, the contact bodies 32c must be accurately aligned with each other in order to produce alignment of the optical fibers 36c. Such alignment may be provided by eliminating the metal sleeve 70 in the bore 42 in the sealing plate 22 so that axial compression of the elastomeric plate will cause contraction of the wall of the center section 44 of the bore 42, thereby aligning the ends of the contacts. It will be appreciated that since the sets of spheres 94c abut each other at their forwardmost surfaces 100c, the end faces of the optical fibers 36c must be located closely adjacent to the surfaces 100c in order to minimize light transmission losses.

Figure 10:
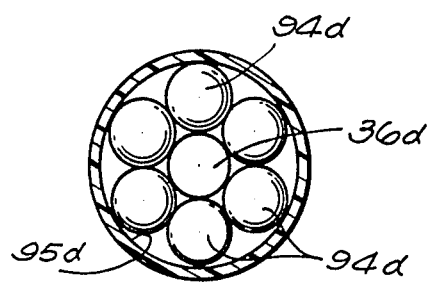
FIG. 10 is an enlarged front end view of still a further embodiment of the contact utilizing more than three alignment spheres for positioning a relatively large optical fiber in the interstitial space defined by the spheres.

Reference is now made to FIG. 10 of the drawings which shows the end of an alternative form of the contact of the present invention which is preferred for use with a relatively large fiber 36d. If three spheres were utilized to align the fiber 36d, it will be appreciated that the diameter of the spheres would be very large, thereby requiring a contact having a large cross section. Therefore, in the embodiment illustrated in FIG. 10, six smaller diameter spheres 94d are utilized. Each sphere 94d contacts each adjacent sphere, the inner race 95d of the contact and the optical fiber 36d. Therefore the spheres 94d function to align the optical fiber in the same manner as the spheres 94 in the embodiment illustrated in FIGS. 1 to 5.

While it is preferred that the alignment spheres of the present invention be metal ball bearings, since they are readily available and are precise in their dimensions, it will be appreciated that the spheres may be made of other materials, such as hard plastic or glass.

It is, therefore, seen that by the present invention there is provided a relatively simple and inexpensive disconnectable coupling arrangement for single optical fibers. The connector provides a controlled, accurate alignment of the mating optical fibers in a manner which minimizes light transmission losses to levels required for efficient long run single data transmission systems, yet is easily assembled and practical for commercial field use.

What is claimed is:

1. A single optical fiber contact comprising:
   a set of equal diameter spheres arranged in closely adjacent, but not necessarily engaging, relationship defining an interstitial space therebetween;
   the centers of said spheres lying in a common plane;
   means for supporting a single optical fiber so that the end portion thereof lies in said interstitial space; and
   said spheres being dimensioned to closely confine a fiber in said space.

2. A single optical fiber contact as set forth in claim 1 wherein: each sphere engages the next adjacent spheres.

3. A single optical fiber contact as set forth in claim 1 wherein:
   said set comprises three of said spheres whereby said interstitial space has a generally tricuspid configuration.

4. A single optical fiber contact as set forth in claim 1 wherein:
   there are provided a plurality of said sets of spheres arranged with their interstitial spaces aligned and adapted to receive a single optical fiber therein.

5. A single optical fiber contact as set forth in claim 1 wherein said fiber supporting means comprises:
   an elongated body having a forward end and a rear end;
   a cylindrical recess in the forward end of said body, said recess receiving said set of spheres; and
   a bore extending from the rear end of said body to the bottom of said recess coaxial with the center axis of said recess, said bore being dimensioned to receive a single optical fiber therein.

6. A single optical fiber contact as set forth in claim 1 wherein:
   said spheres are ball bearings.

7. A single optical fiber contact as set forth in claim 1 including:
   a single optical fiber mounted in said support means with its end portion lying in said interstitial space.

8. A single optical fiber contact as set forth in claim 7 wherein:
   the forwardmost surfaces of said spheres lie in a commonplane; and
   the end face of said fiber is positioned behind said common plane.

9. A single optical fiber contact as set forth in claim 8 wherein:
   said end face of said fiber is positioned behind said common plane a distance such that when a pair of said contacts are abutted with the spheres of one nesting with respect to the spheres of the other contact, the ends of the fibers in the two contacts will be immediately adjacent to, but not contacting, each other.

10. A single optical fiber contact as set forth in claim 1 including:
    a circular ring embracing said set of spheres, the center axis of said ring being perpendicular to said common plane.

11. A single optical fiber contact as set forth in claim 10 wherein:
    said spheres and ring are dimensioned so as to permit said spheres to shift in a circular path inside said ring.

12. A single optical fiber contact as set forth in claim 10 wherein:
    the forwardmost surfaces of said spheres lie in a second common plane parallel to said first-mentioned plane; and
    said ring embodies a forward inwardly extending annular lip restraining said spheres from forward movement of said ring, said lip terminating behind said second common plane.

13. A single optical fiber contact as set forth in claim 12 wherein:
    said lip terminates behind said second common plane a distance of at least 0.268R, where R is the radius of each of said spheres.

14. A single optical fiber contact as set forth in claim 10 wherein:
    said ring is connected to said supporting means.

15. A single optical fiber contact as set forth in claim 14 wherein:
    said ring is integral with said supporting means.

16. A single optical fiber contact comprising:
    a body having a front and a rear;
    a cylindrical recess in the front of said body;
    three equal diameter spheres in said recess arranged in closely adjacent relationship defining a tricuspid interstitial space therebetween;
    the centers of said spheres lying in a plane transverse to the center axis of said recess whereby said axis passes through said interstitial space;
    the cylindrical wall of said recess engaging said spheres; and
    a bore in said body coaxial with said axis and extending from said rear to the bottom of said recess, said bore being dimensioned to receive an optical fiber therein.

17. A single optical fiber contact as set forth in claim 16 wherein:
    said spheres are metal ball bearings.

18. A single optical fiber contact as set forth in claim 16 wherein:
    said body embodies means retaining said spheres in said recess.

19. A single optical fiber contact as set forth in claim 18 wherein:
    said sphere retaining means comprises an inwardly extending lip on said front of said body engaging the forward facing surfaces of said spheres.

20. A single optical fiber contact as set forth in claim 16 wherein:
said spheres engage each other.

21. A single optical fiber contact as set forth in claim 20 wherein:
each of said spheres is capable of rotating about its center axis, and of rotating in a circular path in said recess.

22. A single optical fiber contact comprising:
an elongated cylindrical body having a bore therethrough extending from the front to the rear of said body, said bore being dimensioned to receive an optical fiber therein;
a set of three equal diameter identical spheres adjacent to said front of said body and arranged in closely adjacent, but not necessarily engaging, relationship defining a tricuspid interstitial space therebetween;
said spheres being positioned so that their centers lie in a plane transverse to the center axis of said bore and said interstitial space is aligned with said axis; and
a circular ring extending from said front of said body coaxial with said axis and embracing said spheres.

23. A single optical fiber termination comprising:
means providing a circular race;
a plurality of spheres embraced by said race and defining an interstitial space therebetween; and
an optical fiber extending into said space coaxial with the center axis of said race.

24. A termination as set forth in claim 23 wherein:
said spheres comprise three ball bearings.

25. A fiber optic connector for coupling single optical fibers comprising:
a pair of like-sets of equal diameter spheres, the spheres of each set being arranged in closely adjacent, but not necessarily engaging, relationship defining an interstitial space therebetween;
the centers of said spheres of each set lying in a common plane;
means associated with each of said sets of spheres for supporting a single optical fiber so that the end portion of the fiber lies in the interstitial space of said set, said spheres of each set being dimensioned to closely confine a fiber therein; and
means for mounting said sets of spheres closely together with the interstitial spaces therein aligned whereby fibers in said spaces will be optically coupled.

26. A fiber optic connector as set forth in claim 25 wherein:
said sets of spheres are nested with respect to each other.

27. A fiber optic connector as set forth in claim 25 wherein:
each said set comprises three spheres defining a tricuspid interstitial space therebetween.

28. A fiber optic connector as set forth in claim 25 wherein:
said mounting means abuts said sets of spheres under an axial compression force.

29. A fiber optic connector as set forth in claim 25 including:
means providing a pair of circular races each embracing one of said sets of spheres.

30. A fiber optic connector as set forth in claim 27 wherein:
said mounting means abuts said sets of spheres under an axial compression force causing said spheres of said sets to become nested with respect to each other.

31. A fiber optic connector for coupling single optical fibers comprising:
a pair of contacts each comprising a body having a front and a rear;
a circular recess in the front of each said body containing a set of equal diameter spheres defining an interstitial space therebetween;
the centers of said spheres of said set in each contact lying in a common plane transverse to the center axis of said circular recess;
a bore in each contact body extending from said rear to said recess aligned with said space and dimensioned to receive an optical fiber therein; and
means for positioning said contacts with said sets of spheres abutting each other.

32. A fiber optic connector as set forth in claim 31 wherein:
said positioning means includes a sleeve loosely receiving said contacts in the opposite ends thereof.

33. A fiber optic connector as set forth in claim 31 including:
means abutting said sets of spheres in said contacts under an axial compression force to cause said spheres in said contacts to nest with respect to each other.

34. A fiber optic connector for coupling single optical fibers comprising:
two sets of three equal diameter spheres each defining a tricuspid interstitial space therebetween;
the centers of the spheres of said sets lying in two parallel planes;
each said set of spheres having a forward face and a rear, said forward faces abutting each other with said interstitial spaces aligned; and
a single optical fiber extending from the rear forwardly into the interstitial space in each said set of spheres.

35. A fiber optic connector as set forth in claim 34 wherein:
said spheres of said respective sets are nested with respect to each other.

* * * * *